United States Patent [19]
Dussault et al.

[11] Patent Number: 6,166,997
[45] Date of Patent: Dec. 26, 2000

[54] LOW VOLTAGE POWER SYSTEM FOR A TOWED ACOUSTIC ARRAY

[75] Inventors: Douglas G. Dussault, East Lyme; Donald W. McKay, Groton; Maurice E. Simard, Windham, all of Conn.

[73] Assignee: The United States of America as represented by the Secretary of the Navy, Washington, D.C.

[21] Appl. No.: 09/317,090

[22] Filed: May 21, 1999

[51] Int. Cl.[7] .............................. H04L 29/00; H04B 3/44
[52] U.S. Cl. ............................................ 367/154; 375/257
[58] Field of Search ................................ 367/20, 76, 153, 367/154; 375/214, 257, 258

[56] References Cited

U.S. PATENT DOCUMENTS

| | | | |
|---|---|---|---|
| 4,375,089 | 2/1983 | Thigpen et al. | 367/20 |
| 4,468,785 | 8/1984 | Harris | 375/4 |
| 4,636,992 | 1/1987 | Cretin et al. | 367/20 |
| 4,912,684 | 3/1990 | Fowler | 367/76 |

*Primary Examiner*—Ian J. Lobo
*Attorney, Agent, or Firm*—Michael J. McGowan; Prithvi C. Lall; Michael F. Oglo

[57] ABSTRACT

A low voltage power system for a towed active array sonar is provided. The low voltage power system includes a shipside power supply driving a step-up transformer which is connected to the tow cable transmission line. The transmission line is connected to a second step-up transformer which provides the signal voltage to the active transducer. The transducer signal voltage is also used to drive a rectifier and DC power supply which provides DC bias voltage to the transducer. The DC voltage is isolated from the tow cable by a blocking capacitor.

15 Claims, 1 Drawing Sheet

LOW VOLTAGE POWER SYSTEM FOR A TOWED ACOUSTIC ARRAY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention relates to power systems for sonar arrays and n particular to low voltage power systems.

(2) Description of the Prior Art

Transducers in sonar arrays require high voltages to provide discrete short duration pulses. Present towed systems that require high voltage use a drive voltage that is lower in the tow cable and higher in the tow-body (where the transducers are located). Where a high voltage bias is also required, it is introduced at the ship's towed end. As a result, both high bias voltage and high drive voltage are present at the ship's towed end and routed down the tow cable to the towed body. These very high voltages in the tow cable create reliability and safety problems. These problems are particularly acute with heavy cable due to possible short and arcing problems in the cable-handling equipment. What is needed is a means of delivering high voltage pulses to the transducers in the towed body without requiring high voltage and/or current in the tow cable.

SUMMARY OF THE INVENTION

Accordingly, it is an object of the invention to provide a towed active sonar power system having reduced electrical stress.

It is another object of the invention to provide a towed active sonar power system having low voltage at the ship's end of the tow cable and in the tow cable.

It is a further object of the invention to provide a towed active sonar power system having a voltage step-up transformer supplying the transducer and isolation of the voltage on the transducer side from the tow cable.

The invention is a low voltage power supply system for a high voltage towed active array sonar comprising a low voltage AC ship's side power source with a step-up transformer connecting to a tow cable transmission line. The tow cable transmission line connects to a tow-body mounted step-up transformer. The tow-body has a reactance circuit providing high voltage to the sonar transducer and a second reactance circuit which provides high voltage DC bias to the sonar transducer. The DC bias voltage is on the order of several kilo volts but requires very little current. The DC bias voltage is isolated from the tow-body step-up transformer by a blocking capacitor, thereby preventing the bias voltage from being shorted out by the transformer winding. The result is that several kilo volts are applied to the transducer while requiring a much lower voltage (from ground potential) in the tow cable.

BRIEF DESCRIPTION OF THE DRAWINGS

The foregoing objects and other advantages of the present invention will be more fully understood from the following detailed description and reference to the appended drawings wherein the single FIGURE is a circuit diagram depicting circuits shipside, the tow cable, and circuits within the sonar tow-body.

DESCRIPTION OF THE PREFERRED EMBODIMENTS

Figure 1:
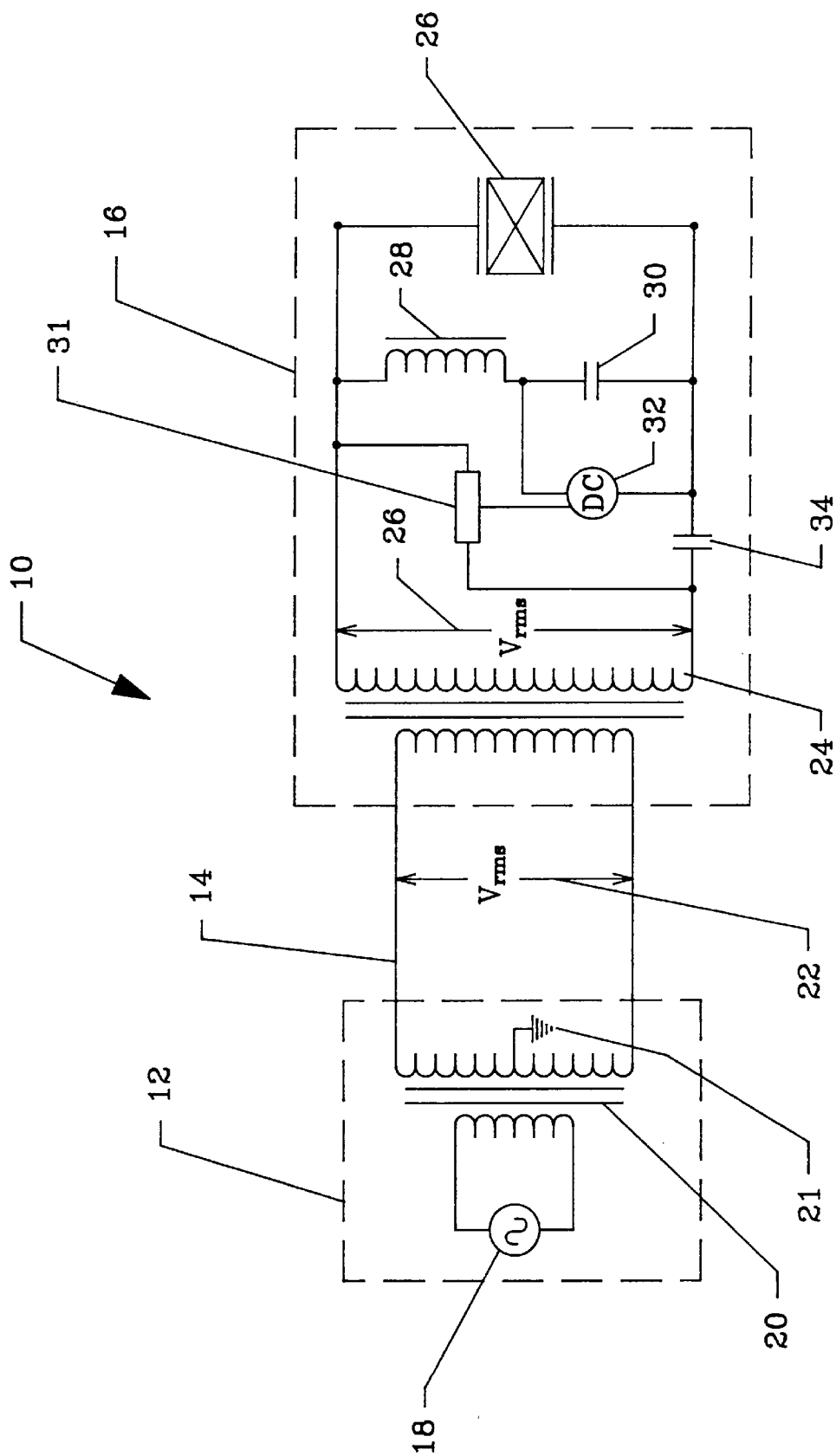

Referring now to the single FIGURE, the low voltage power system for a towed active acoustic array, designated by reference numeral 10, is shown with its major components. The low voltage power system 10 comprises the shipside equipment 12, the tow cable 14, and the tow-body equipment 16.

The shipside equipment 12 includes an AC power source 18 driving a first step-up transformer 20, thereby providing voltage to the first end of tow cable 14. This voltage is represented by $V_{rms}$ arrow 22. The voltage in the tow cable 14 is determined by a trade-off between voltage and current to provide the necessary power to the tow-body while minimizing cable size and weight. Using a higher voltage allows the use of a smaller conducting wire (as current can then be reduced). However, additional insulation is required to prevent shorting and arcing. The use of lower voltage (and higher current) requires a larger conducting wire, but less insulation. Depending on the particular transducer, an optimum voltage is selected to minimize the wire-insulation combination of the tow cable 14. In order to further reduce the insulation requirement, a ground 21 is included in the first step-up transformer 20. This ground 21 maintains the voltage in the tow cable 14 at $\pm \frac{1}{2} V_{rms}$ 21 avoiding a floating condition where the towline can operate at a higher voltage than $\frac{1}{2} V_{rms}$ referenced to ground. For example, only a 2500 volt insulation is required using this mechanism, while delivering a $V_{rms}$ of 5000 volts.

The tow cable 14 is connected to the tow-body 16 at a second end. Within the tow-body 16, a second step-up transformer 24 increases the voltage to $V_{rms}$ 26. This voltage is the transducer AC operating voltage acting in a reactance circuit in parallel with the DC bias voltage. The DC bias voltage is supplied by a DC power supply 32 which draws power from the transducer operating circuit through rectifier 31. The output of the DC power supply is a DC bias voltage equal to the voltage of the AC operating circuit, $V_{rms}$ 26. As one example, in the preferred embodiment, the DC bias voltage is 5000 volts. The DC bias voltage is applied to the transducer 26 along with the AC signal, $V_{rms}$ 26, to operate the transducer. Blocking capacitor 34 prevents the DC bias voltage from feeding back into the second step-up transformer 24. The DC bias circuit includes the inductor 28 and the storage capacitor 30. The inductor 28 blocks $V_{rms}$ 26 from the DC power supply.

The features and advantages of the present invention are numerous. The low voltage power system allows the active acoustic array to be powered by existing ship's AC power systems. Additionally, the voltage step-up for the tow cable provides for a transmission line of reduced size and weight and provides a reduced safety hazard as it is no longer necessary to provide either a high voltage AC transducer signal, or the high voltage DC bias voltage along the tow cable. Additionally, the DC bias voltage is drawn from the AC transducer power and is isolated from the secondary of the step-up transformer. It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A low voltage power system for a towed active array sonar system comprising:

a ship's side AC power supply;

a first step-up transformer connected to said AC power supply;

a tow cable having a transmission line with a first end thereof and a second end, the first end connected to said first step-up transformer and having a connection for a tow-body on said second end;

a second step-up transformer connected to the second end of said tow cable;

a reactance circuit connected to said second step-up transformer;

a transducer connected to said second transformer in parallel with said reactance circuit; and a DC bias circuit connected to said transducer in parallel with said second step-up transformer.

2. A low voltage power system for a towed active array sonar system as in claim 1 wherein said first step-up transformer has a ground connection to maintain the transformer voltage in the range of $\pm\frac{1}{2} V_{rms}$ with respect to ground.

3. A low voltage power system for a towed active array sonar system as in claim 1 wherein said reactance circuit comprises an inductor and capacitor connected in series.

4. A low voltage power system for a towed active array sonar system as in claim 1 wherein said DC bias circuit comprises a rectifier connected to a DC power source.

5. A low voltage power system for a towed active array sonar system as in claim 4 wherein said DC bias circuit further comprises a blocking capacitor isolating said DC circuit from said second step-up transformer.

6. A low voltage power system for a towed active array sonar system comprising:

shipside equipment including an AC power supply and first step up transformer connected thereto;

a tow cable connected to said first step up transformer at a first end thereof and to a tow body at a second end thereof; and tow-body equipment having an integral DC bias voltage circuit.

7. A low voltage power system for a towed active array sonar system as in claim 6 wherein said shipside equipment comprises a shipside AC power supply connected to a first step up transformer.

8. A low voltage power system for a towed active array sonar system as in claim 6 wherein said tow-body equipment further comprises a second step-up transformer.

9. A low voltage power system for a towed active array sonar system as in claim 8 wherein said tow-body equipment further comprises a reactance circuit to said second step-up transformer.

10. A low voltage power system for a towed active array sonar system as in claim 9 wherein said tow-body equipment further comprises a transducer connected in parallel with said reactance circuit.

11. A low voltage power system for a towed active array sonar system as in claim 9 wherein said reactance circuit comprises an inductor in series with a storage capacitor.

12. A low voltage power system for a towed active array sonar system as in claim 10 wherein said integral DC bias voltage circuit comprises a rectifier connected to said second step-up transformer.

13. A low voltage power system for a towed active array sonar system as in claim 12 wherein said integral DC bias voltage circuit further comprises a DC power supply connected to said rectifier.

14. A low voltage power system for a towed active array sonar system as in claim 13 wherein said DC power supply is connected to said transducer.

15. A low voltage power system for a towed active array sonar system as in claim 14 wherein said DC bias circuit further comprises a blocking capacitor isolating the bias voltage from said second step-up transformer.

\* \* \* \* \*